May 3, 1949.  J. J. CAMPOBASSO ET AL  2,468,865
SEWAGE TREATMENT
Filed Dec. 29, 1945
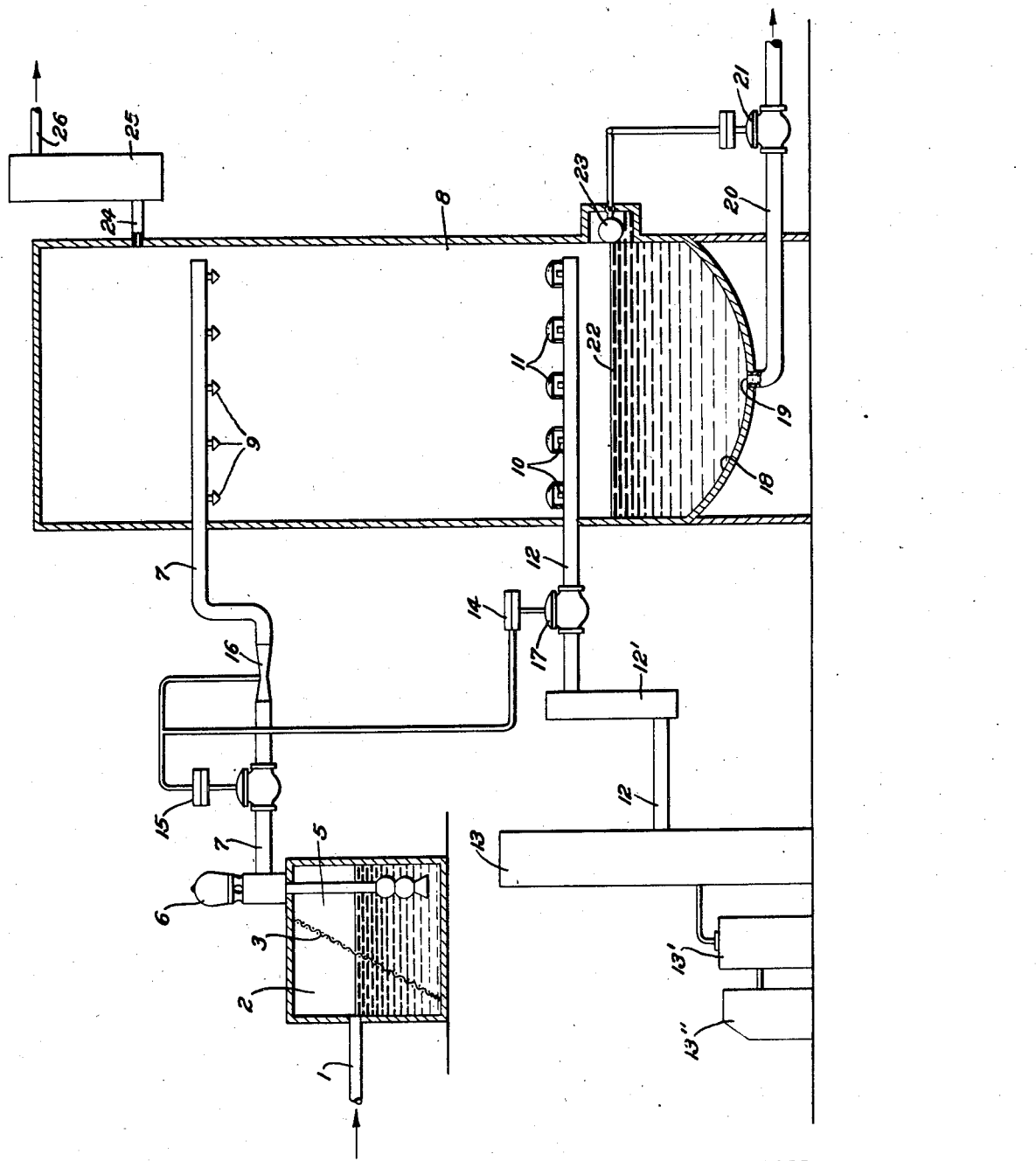
INVENTORS
JOHN J. CAMPOBASSO AND
WARREN M. CAMPBELL
BY Ezekiel Wolf
ATTORNEY Patented May 3, 1949

2,468,865

UNITED STATES PATENT OFFICE 2,468,865

SEWAGE TREATMENT

John J. Campobasso, Arlington, and Warren M. Campbell, Winthrop, Mass.

Application December 29, 1945, Serial No. 638,270

3 Claims. (Cl. 210—2)

The present invention relates to a system and method for domestic and industrial sewage treatment and disposal wherein a complete treatment may be effected.

While more attention has been paid to the proper disposal of sewage recently, it is still a practice to dump raw sewage from large cities into rivers and the oceans relying upon nature to effect the purification of the water which is polluted by the disposal. If there is considerable sunshine and fairly active water, nature will do the job of purification to a certain degree, after considerable time has elapsed. Since the weather is uncertain in most places and often at certain times of the year sun is lacking, natural purification is a hit or miss for the most part.

Again proper sewage disposal will also prevent local pollution and further the products of sewage has for the greater part industrial and agricultural uses. In the present invention the system is such that complete disposal of the sewage may be obtained in a simple and efficient manner. The sewage enters the system at the inlet, is screened, after which the liquid is pumped through a purification chamber from which the gases leave at one point and the purified water at another point. Tandem arrangement may be used when high purification is desired.

Without further describing the merits and advantages of the present invention, the invention will be described in the specification set forth below in connection with the drawings schematically showing the system.

The inlet pipe for the sewage is shown at the left at 1, which empties into a separator tank 2 which is partitioned with a rack screen 3 to gather course materials which may be raked off by mechanical means and disposed of by incineration. The screened sewage in the portion 5 of the tank 2 is pumped by pressure pump 6 over the pressure line 7 to the enclosed tower 8. Within the tower 8 at the upper portion are a group of spray nozzles 9, 9, connected to the line 7 for spraying the sewage downward in the enclosed tank 8 which may be of steel lined with a non-corrosive, concrete or other type of suitable construction.

At the lower portion of the tower or tank, there is positioned a series of oxygen nozzles 10, 10, which may have hoods or covers 11, 11, to prevent the openings in the nozzles from being clogged up due to the spray coming down if desired. The oxygen is forced or shot upwards and the spray downwards in the opposite direction, thus providing the most direct contact over a long path. Baffles may be used in the tower if desired, but they are not entirely necessary.

Oxygen is fed to the nozzle 10 by the supply line 12 from the oxygen generating unit which may comprise the prime mover 13'', the compressor 13' and the oxygen generator 13 for producing oxygen from the air or otherwise. The oxygen is fed over the line 12 through a meter 12' which measures flow and through a throttle valve 17 which is controlled by the controller 14 for regulating the amount of oxygen fed into the tank in proportion to the liquid flow over the line 7.

A regulating pressure valve 15 in the line 7 provides the varying pressure in the line 16 which controls the pressure in the regulator valve 14 which in turn controls the throttle valve 17. When the flow over the line 7 is increased, the pressure in the line 16 is decreased and the valve 14, which may be of the diaphragm-pressure type, operates to permit more oxygen to flow through the throttle 17 which the regulator valve 14 controls.

At the bottom of the tower or chamber 8, a basin 18 may be provided with an outlet at the lowest point 19 through which purified or oxidized sewage flows into the outlet line 20 in which there is located a control valve 21 whereby the liquid level 22 may be regulated through a level float 23 which controls the opening in the valve 21. The liquid level 22 is maintained below the air or oxygen nozzles so that the nozzles are free at all times. Chemically the treatment is one of wet combustion of the organic matter in the water accelerated by the use of oxygen. The process may be further accelerated by the use of heat.

At the top of the tower there is a gas outlet pipe 24 which connects to a surge chamber 25, which may be of the usual type, and from this surge chamber there is an outlet line 26 which may go to a gas holder or scrubber for further processing of the gas.

The operation of the system will be understood from the description above. The intimate contact of the water spray and the oxygen flowing in opposite directions causes the oxidization of all organic matter or other impurities in the water. Where several days are required for outdoor oxidation under general conditions, in the present arrangement this may be accomplished in a continuous process under comparatively rapid flow.

In a tandem arrangement previously mentioned, the outlet pipe 20 would go to a second tank which would also be supplied with air or oxygen from the supply line 12. The oxygen in the exhaust gases from the line 26 may be ex-

Having now described our invention, we claim:

1. A system for sewage disposal comprising in combination a separation tank having a sewage inlet, a purification tower, having purifying gas nozzles in the bottom portions thereof for directing the purifying gases upwards and spray nozzles in the top portion thereof for directing the sewage water to be purified downwards, means for pumping the sewage water from the separation tank to the spray nozzles, means for supplying the purifying gases to said gas nozzles, an outlet means for exhaust gases at the top section of said tower above the position of the spray nozzles, an outlet means for the purified waters below the level of the gas nozzles and means for maintaining the level of said waters below that of the gas nozzles.

2. A system for sewage disposal comprising in combination a separation tank having a sewage inlet, a purification tower, having purifying gas nozzles in the bottom portions thereof for directing the purifying gases upwards and spray nozzles in the top portion thereof for directing the sewage water to be purified downwards, means for pumping the sewage water from the separation tank to the spray nozzles, means for supplying the purifying gases to said gas nozzles, an outlet means for exhaust gases at the top section of said tower above the position of the spray nozzles, an outlet means for the purified waters below the level of the gas nozzles, and means for maintaining the level of said waters below that of the gas nozzles and valve regulating means operative by the volume of sewage water flow into the tower to control the flow of the purifying gases into the tower.

3. A system for sewage disposal comprising in combination a separation tank having a sewage inlet, a purification tower, having purifying gas nozzles in the bottom portions thereof for directing the purifying gases upwards and spray nozzles in the top portion thereof for directing the sewage water to be purified downwards, means for pumping the sewage water from the separation tank to the spray nozzles, means for supplying the purifying gases to said gas nozzles, an outlet means for exhaust gases at the top section of said tower above the position of the spray nozzles, an outlet means for the purified waters below the level of the gas nozzles, and means for maintaining the level of said waters below that of the gas nozzles and valve regulating means operative by the volume of sewage water flow into the tower to control the flow of the purifying gases into the tower, comprising a pressure valve in the input sewage water line to said tower, a throttle valve in the gas line to said tower and valve means operated by said pressure valve for operating said throttle valve.

JOHN J. CAMPOBASSO.
WARREN M. CAMPBELL.

REFERENCES CITED

The following references are of record in the file of this patent:

UNITED STATES PATENTS

| Number | Name | Date |
|---|---|---|
| 368,071 | Coes | Aug. 9, 1887 |
| 385,769 | Miller | July 10, 1888 |
| 877,569 | Joseph | Jan. 28, 1908 |
| 938,075 | Reisert | Oct. 26, 1909 |
| 1,047,534 | Joseph | Dec. 17, 1912 |
| 1,420,046 | MacGregor et al. | June 20, 1922 |
| 1,522,907 | Price | Jan. 13, 1925 |
| 1,573,079 | McKee | Feb. 16, 1926 |
| 1,943,890 | Gibson et al. | Jan. 16, 1934 |
| 1,964,487 | Smith | June 26, 1934 |
| 2,090,405 | Shook | Aug. 17, 1937 |
| 2,114,601 | Laughlin | Apr. 19, 1938 |
| 2,141,979 | Halvorson et al. | Dec. 27, 1938 |
| 2,308,866 | Dekema | Jan. 19, 1943 |
| 2,311,830 | Hawley | Feb. 23, 1943 |

FOREIGN PATENTS

| Number | Country | Date |
|---|---|---|
| 11,639 | Great Britain | 1909 |
| 388,962 | France | June 15, 1908 |